(12) United States Patent
Numaoka

(10) Patent No.: US 6,489,944 B2
(45) Date of Patent: *Dec. 3, 2002

(54) APPARATUS AND METHOD FOR IMAGE DISPLAY

(75) Inventor: Chisato Numaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/885,475

(22) Filed: Jun. 20, 2001

(65) Prior Publication Data

US 2001/0031082 A1 Oct. 18, 2001

Related U.S. Application Data

(62) Division of application No. 09/049,084, filed on Mar. 27, 1998.

(30) Foreign Application Priority Data

Apr. 1, 1997 (JP) .............................. 9-083134
Oct. 31, 1997 (JP) .............................. 9-301095

(51) Int. Cl.[7] ................................................ G09G 5/00
(52) U.S. Cl. ........................ 345/156; 345/419; 382/107
(58) Field of Search ................. 345/419, 156, 345/672

(56) References Cited

U.S. PATENT DOCUMENTS 6,297,803 B1 * 10/2001 Numaoka ................... 345/156

FOREIGN PATENT DOCUMENTS

GB 2134344 A * 5/1983 .............. 382/107

* cited by examiner

Primary Examiner—Mark Zimmerman
Assistant Examiner—Philip H. Stevenson
(74) Attorney, Agent, or Firm—Jay H. Maioli

(57) ABSTRACT

A mobile data apparatus equipped with a display is improved in both operability and mobility.

A frame difference detector 4 is provided for detecting a change in image between two consecutive frames transferred from a pair of frame buffers 2 and 3. The change in image is used in a barycenter calculator 5 for calculating the barycenter of each image. The barycenter is saved in a barycenter coordinates memory 6. A camera movement calculator 6 calculates a difference between the barycenter saved in the barycenter coordinates memory 6 and a reference barycenter saved in a barycenter coordinates memory 7 to determine a horizontal pixel shift DPx and a vertical pixel shift DPy of a camera. In response to those shifts, a horizontal angle-of-rotation controller 9 and a vertical angle-of-rotation controller 10 determine angles of rotation along the horizontal and vertical directions hx and hy for a virtual camera 11. Accordingly, the view of the virtual camera 11 can duly be controlled.

5 Claims, 3 Drawing Sheets

APPARATUS AND METHOD FOR IMAGE DISPLAY

This application is a division of application Ser. No. 09/049,084, filed Mar. 27, 1998.

BACKGROUND OF THE INVENTION

1. Field of the Invention

The present invention relates to an apparatus and a method for displaying an image of view point information produced with a remote-controlled camera.

2. Description of Related Art

As a wide range of Internet services have overwhelmingly been provided, their displaying data include not only texts, still images, and sounds but also motion images and 3-D dynamic model spaces. For developing such 3-D dynamic model spaces, the VRML (virtual reality modeling language) is standardized in August, 1996 and used commonly as a today's standard technology. This technology allows a variety of 3-D model spaces of one format, which may simulate museums an theaters for example, to be constructed as information to the Internet and accessed by any user who operates its computer connected to the Internet to enjoy as if he or she walks around in a museum or a theater in virtual sense. For the purpose, an image displayed on a display unit of the computer is based on the view of a virtual camera installed virtually in the 3-D model spaces. Upon receiving a command from the user requesting for walking about in a 3-D model space, the computer controls the virtual camera for desired positioning and orientation. As the result, an image is displayed on the display of the computer showing as if the user walks about in the 3-D model space.

The command to the computer may be given by the user operating with its hand or fingers a pointing device, such as a mouse or a joystick, or a touch display in all upward, downward, leftward, and rightward directions.

The commanding of the computer with the use of a hand or fingers operating the pointing device, such as a mouse or a joystick, or the touch display in all upward, downward, leftward, and rightward directions is substantially suited for providing a modification or a command on the screen displaying a relatively less motion image such as a text or a still image. It is however unfavorable to control quick movements of a view point or the view of the virtual camera in 3-D mode spaces. It is routine that when a person changes its view point in daily life, its eyes or head is shifted to a desired location but rarely moves and orients the object to be viewed.

This drawback may not be critical with a desk-top type of the computer where the view of the user is fixed to its display screen at a stationary location while controlling an indicator or pointer on the screen by manipulating the control with the hand or fingers.

However, when a specific type or namely, a head-mounting type of the display is used, it is hung on the front of the eyes of the user and moves together with the head. When a hand-held type of the display is used, it is held by the hand of the user and turned to any of upward, downward, leftward, and rightward directions in response to the movement of the head so that it can stay at the front of the user's eyes.

In a system equipped with a mobile type of the display which can be held in the front of the eyes of a user, it is disadvantageous for dynamically shifting through a computer the view point of a virtual camera in a 3-D model space to use a pointing device, such as a mouse or a joystick, or a touch device which can be controlled by the hand or fingers in upward, downward, leftward, and rightward directions.

It is also known in a virtual reality technology or a tele-existence technology for controlling the dynamic movement of a view point with a computer that the view point of a user is normally measured by a measuring device, such as an eye-tracking device or a heat-position tracing device, which can be fitted to a body of the user. The fitting of the device to the body will add another inconvenience to the user, impairing the operability and the mobility.

SUMMARY OF THE INVENTION

It is a primary object of the present invention to provide an apparatus and a method for displaying an image where the view point of a virtual camera can dynamically be shifted in response to the movement of a mobile set equipped with a display.

It is another object of the present invention to provide an apparatus and a method for displaying an image where its mobile set equipped with a display is improved in both the operability and the mobility.

An image displaying apparatus according to the present invention includes a controller which processes input image data produced by an image input unit which pictures the background of an image display unit in order to detect a movement of the image display unit, and an image data generator which generates data indicative of the view of a camera remote controlled in response to the detected movement, whereby the image data can be displayed on the image display unit.

An image displaying method according to the present invention comprises the steps of picturing the background of an image display unit, processing pictured data to detect a movement of the image display unit, generating image data of the view of a camera remote controlled in response to the detected movement, and displaying it on the image display unit.

DESCRIPTION OF PREFERRED EMBODIMENTS

Preferred embodiments of the present invention will be described in more detail referring to the accompanying drawings.

Figure 1:
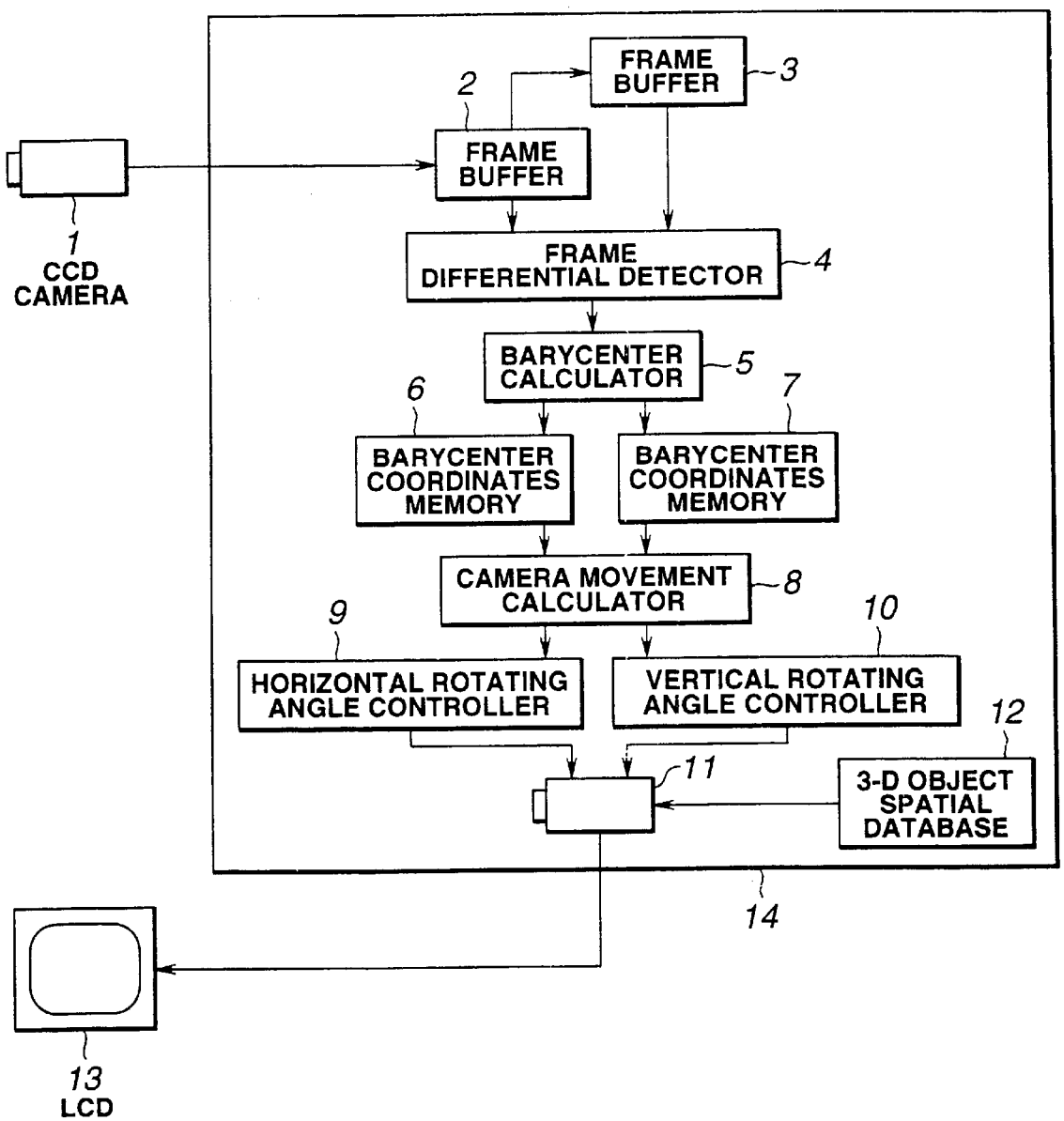
FIG. 1 is a block diagram of a functional arrangement of an image displaying apparatus according to the present invention.

An image displaying apparatus according to the present invention has an arrangement shown in FIG. 1. The image displaying apparatus is a mobile type image displaying apparatus comprising a microcomputer 14, and an image input unit 1 and an image display unit 13 both connected to the microcomputer 14.

The image input unit 1 comprises a CCD camera for picturing the background of the image display unit 13. The image display unit 13 is a liquid crystal display for displaying an image of visual information supplied from the microcomputer 14.

The microcomputer 14 includes, as best shown in the functional block diagram of FIG. 1, a frame difference detector 4 to which image data generated by the image input unit 1 is supplied via frame buffers 2 and 3, a barycenter calculator 5 connected to the frame difference detector 4, a camera movement calculator 8 connected via barycenter coordinates memories 6 and 7 to the barycenter calculator 5, a pair of a horizontal angle-of-rotation controller 9 and a vertical angle-of-rotation controller 10 both connected to the camera movement calculator 8, a virtual camera 11 connected to the horizontal and vertical angle-of-rotation controllers 9, 10, and a 3-D object space database 12 connected to the virtual camera 11 for constructing a 3-D model space.

Figure 2:
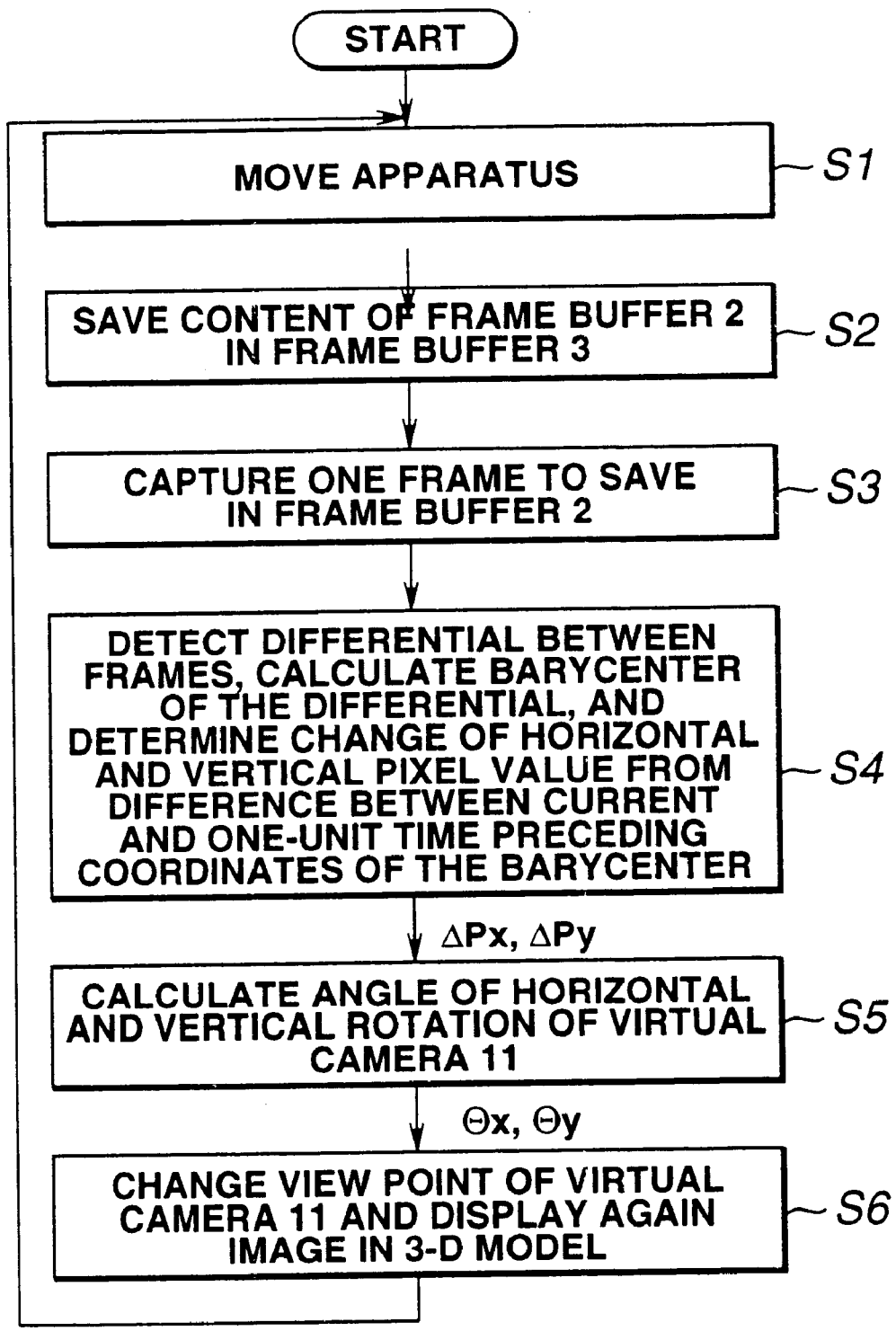
FIG. 2 is a flowchart showing actions of the image displaying apparatus.

The image displaying apparatus performs a succession of actions, as shown in a flowchart of FIG. 2, including moving its body equipped with the image display unit 13 (Step S1), saving in the frame buffer 2 each frame of input image data generated by the image input unit 1 imaging the background of the input display unit 13, and transferring the saved data of the frame buffer 2 to the frame buffer 3 before the succeeding frame is fed to the frame buffer 2 (Step S2), and saving the succeeding frame of the image data (Step S3).

The frame difference detector 4 calculates an optical flow between two consecutive frames from the saved data of the frame buffers 2 and 3 to detect a change in the image between the two frames. The change in the image is transferred to the barycenter calculator 5 where it is used to calculate the barycenter of the change which is then saved in the barycenter coordinates memory 6. In the other barycenter coordinates memory 7, the barycenter is initialized to (0, 0).

The camera movement calculator 8 calculates a difference between two outputs of the barycenter coordinates memories 6 and 7 to determine a horizontal pixel level shift $\Delta Px$ and a vertical pixel level shift $\Delta Py$ (Step S4). Then, the saved data of the barycenter coordinates memory 6 is transferred to the barycenter coordinates memory 7.

This is followed by the horizontal angle of rotation controller 9 and the vertical angle of rotation controller 10 calculating an angle of rotation along the horizontal direction $\theta x$ and an angle of rotation along the vertical direction $\theta y$ respectively from the resultant shifts of the camera movement calculator 8 to control the point of view of the virtual camera 11 (Step S5).

The virtual camera 11 acquires object data in the 3-D model space from the 3-D object space database 12 and projects 3-D objects on the two dimensional screen as seen in its view. A resultant 3-D image is displayed on the liquid crystal display screen of the image display unit 13 (Step S6).

The angle of rotation along the horizontal direction $\theta x$ and the angle of rotation along the vertical direction $\theta y$ for controlling the virtual camera 11 at Step S5 may be calculated from the following equations. It is assumed herein that the CCD camera of the image input unit 1 is spaced substantially equally from subjects around by a distance d. The number of pixels along the horizontal direction in one frame is Px and along the vertical direction is Py. The value along the vertical direction may be approximated from that along the horizontal direction and the following explanation is based on the horizontal direction. When the CCD camera of the image input unit 1 is turned through the angle of rotation along the horizontal direction $\theta x$, the actual distance of movement on the screen is Lx.

$$\theta x = \tan^{-1}(Lx/d) \quad (1)$$

As the shift of the pixel level in one frame is $\Delta Px$ in response to the movement through $\theta x$, $Lx_{MAX}:Lx=Px:\Delta Px$ is established where $Lx_{MAX}$ is an actual distance of movement. Then, $$Lx(\Delta px/Px) \cdot Lx_{MAX} \quad (2)$$

When the equation (1) is then expressed by the equation (2), $$\theta x = \tan^{-1}(Lx_{MAX}/(Px \cdot d)) \cdot \Delta Px \quad (3)$$

There is now no variable. Similarly, along the vertical direction is expressed by:

$$\theta y = \tan^{-1}(Ly_{MAX}/(Py \cdot d)) \cdot \Delta Py \quad (4)$$

Accordingly, if $Lx_{MAX}=d=80$ cm and the number of pixels along the horizontal direction Px is 160 at $\Delta Px=160$, the camera is turned by 45 degrees to the right.

The image displaying apparatus having the foregoing arrangement allows the horizontal angle-of-rotation controller 9 and the vertical angle-of-rotation controller 10 of the microcomputer 14 to detect a movement of the image display unit 13 through processing the input image data supplied from the image input unit 1 via the two frame buffers 2 and 3 so that they function as a controller unit for remote-control of the camera view, and permits the virtual camera 11 and the 3-D object space database 12 to function in a combination as an image data generator for generating image data of the camera view remote controlled by the above mentioned controller unit. In operation, the image data of the camera view remote controlled in response to the motion of the image display unit 13 can be generated by the virtual camera 11 and displayed on the image display unit 13.

Figure 3:
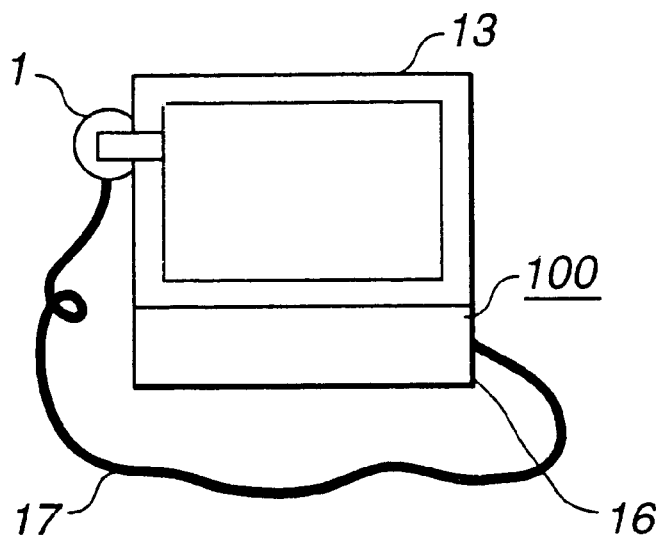
FIG. 3 is a front view of a mobile data assistant associated with the present invention.
Figure 4:
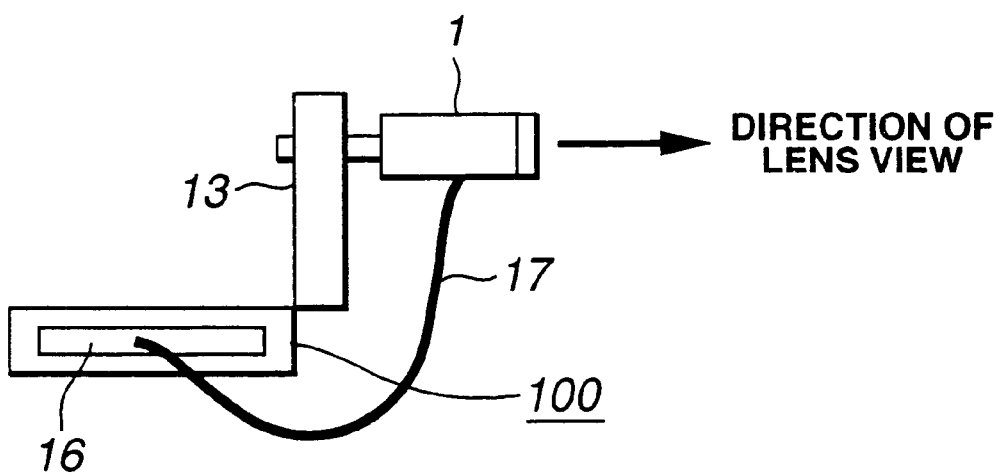
FIG. 4 is a side view of the mobile data assistant.

FIG. 3 is a front view of a mobile data assistant 100 associated with the present invention. FIG. 4 is a side view of the mobile data assistant 100.

The mobile data assistant 100 is a hand-held computer including a microcomputer 14 of the image displaying apparatus shown in FIG. 1. The mobile data assistant 100 has a small-sized video camera connected by a video cable 17 to a video capture board 16 and operated as the image input unit 1. Image data produced by the image input unit 1 imaging the background of the image display unit 13 equipped with a liquid crystal display is fed to the microcomputer 14 as a data input for detecting a motion of the image display unit 13. Similar to the operation of the image displaying apparatus shown in FIG. 1, the mobile data assistant 100 permits the image data of the camera view remote controlled in response to the motion of the image display unit 13 can be generated by the virtual camera 11 and displayed on the image display unit 13.

In he mobile data assistant 100, the image input unit 1 for image processing is separated from a controller of the virtual camera 11 to produce and supply only data of the angle of rotation along the horizontal and vertical directions for the camera 11 thus contributing to the versatility of the entire arrangement. This permits any combination of three different units: the image input unit 1 for image processing, the image display unit 13, and the camera 11 to be controlled, for desired application.

The mobile data assistant 100 detects upward, downward, leftward, and rightward movements of a body of its image display unit 13 from image processing and uses their data to shift the view of the virtual camera in a 3-D model space displayed on the screen of the image display unit 13. Accordingly, the mobile data assistant 100 permits upward, downward, leftward, and rightward views in the 3-D model space to be created as closer as seen by the human eyes while its mobility and operability are improved.

The present invention is not limited to the prescribed embodiments where all the 3-D model space data is recorded in the 3-D object space database 12 provided as a fundamental function element of the microcomputer 14 in the main body. Any type of the 3-D model space data can be acquired from external sources. For example, the microcomputer 14 may be communicated with the Internet through a modem port of a portable telephone not shown to receive a desired type of the 3-D model space data from the Internet.

Also, the present invention is not limited to such a model as described previously where the virtual camera 11 is virtually located in a 3-D model space for implementing the image data produced by an image data generator of the microcomputer 4 or a combination of the camera 11 and the 3-D object space database 12 and displayed on the image display unit 13. The image data generator may include an actual video camera, not shown, which is located in a real space and can be remote controlled by the controller for having a desired view.

Although the small-sized video camera of the image input unit 1 in the mobile data assistant 100 is connected via the video capture board 16 to the hand-held computer, it can be built integral with the hand-held computer.

As set forth above, according to the present invention, the movement of the image display unit is detected through processing input image data produced by the image input unit picturing the background of the image display unit and used for generating and displaying the view of a camera remote controlled on the image display unit. This permits the image display unit to be always kept in the front of the eyes of a user through shifting the apparatus in any of upward, downward, leftward, and rightward directions.

What is claimed is:

1. A portable remote camera controlling apparatus comprising:
   a portable image display unit;
   an image input unit mounted on the portable image display unit for providing a base image corresponding to a view of the portable image display unit at an initial position;
   a controller for processing input image data produced by the image input unit, for detecting a movement of the view of the portable image display unit to a subsequent position, and for remote controlling a view of a remote camera in accordance with a detected movement, wherein the remote camera is placed remotely from the portable image display unit in a physical space;
   an image data generator for generating data indicative of the view of the remote camera controlled by the controller, in which a resultant image generated by the image data generator is displayed on the portable image display unit; and
   a movement calculator for calculating a horizontal pixel level shift and a vertical pixel level shift of the portable image display unit based on the detected movement of the view of the portable image display unit from the initial position to the subsequent position and respectively translated to an angle of rotation about a horizontal direction and an angle of rotation about a vertical direction for controlling the view of the remote camera and a resultant display on the portable image display unit.

2. The image displaying apparatus according to claim 1, wherein the controller detects the movement of the portable image display unit from a change in barycenter of the input image between two consecutive frames produced by the portable image input unit.

3. A portable remote camera controlling method comprising the steps of:
   providing a base image corresponding to a view of a portable image display unit at an initial position by using an image input unit mounted on the portable image display unit;
   processing input image data produced by the image input unit to detect a movement of the view of the portable image display unit to a subsequent position and remote controlling a view of a remote camera in accordance with a detected movement, wherein the remote camera is placed remotely from the portable image display unit in a physical space;
   generating data indicative of the view of the remote camera controlled in response to the movement of the portable image display unit detected in said step of processing;
   displaying on the portable image display unit a resultant image based on data generated in said step of generating; and
   calculating a horizontal pixel level shift and a vertical pixel level shift of the portable display unit based on the detected movement of the view of the portable display unit from the initial position to the subsequent position and respectively translated to an angle of rotation about a horizontal direction and an angle of rotation about a vertical direction for controlling the view of the remote camera and the resultant display on the portable display unit.

4. The image displaying method according to claim 3, wherein the step of calculating includes calculating a change in barycenter of the input image between two consecutive frames produced by the image input unit.

5. A portable remote camera controlling system, comprising:
   a portable image display unit;
   an image input unit mounted on the portable image display unit for providing a base image corresponding to a view of the portable image display unit at an initial position;
   a remote camera unit independent of said portable image display unit, wherein the remote camera is placed remotely from the portable image display unit in a physical space;
   a controller for processing input image data produced by the image input unit, for detecting a movement of the view of the portable image display unit to a subsequent position, and for remote controlling a view of the remote camera in accordance with a detected movement;
   an image data generator for generating data indicative of the view of the remote camera controlled by the controller, in which a resultant image from data generated by the image data generator is displayed on the portable image display unit; and
   a movement calculator for calculating a horizontal pixel level shift and a vertical pixel level shift of the portable display unit based on the detected movement of the view of the portable display unit from the initial position to the subsequent position and respectively translated to an angle of rotation about a horizontal direction and an angle of rotation about a vertical direction for controlling the view of the remote camera and the resultant display on the portable image display unit.

* * * * *